United States Patent [19]
Nakamura

[11] Patent Number: 5,948,841
[45] Date of Patent: Sep. 7, 1999

[54] PROCESS FOR PRODUCTION OF STABILIZED OXYMETHYLENE COPOLYMER

[75] Inventor: Hideki Nakamura, Kurashiki, Japan

[73] Assignee: Asahi Kasei Kogyo Kabushiki Kaisha, Osaka, Japan

[21] Appl. No.: 08/894,164

[22] PCT Filed: Jan. 26, 1996

[86] PCT No.: PCT/JP96/00149

§ 371 Date: Jul. 29, 1997

§ 102(e) Date: Jul. 29, 1997

[87] PCT Pub. No.: WO96/23825

PCT Pub. Date: Aug. 8, 1996

[30] Foreign Application Priority Data

Feb. 2, 1995 [JP] Japan .................................... 7/035913

[51] Int. Cl.$^6$ .............................. C08K 5/18; C08K 5/098
[52] U.S. Cl. .......................... 524/255; 524/593; 524/612
[58] Field of Search .................................... 528/403, 270, 528/501; 524/255, 593, 612

[56] References Cited

U.S. PATENT DOCUMENTS 5,144,005   9/1992   Sextro et al. .

FOREIGN PATENT DOCUMENTS

A-63-291915   11/1988   Japan .
A-1-306415    12/1989   Japan .

*Primary Examiner*—Veronica P. Hoke

[57] ABSTRACT

A process for producing a stabilized oxymethylene copolymer, which comprises subjecting a crude oxymethylene copolymer to terminal stabilization in an extruder (A) having a terminal-stabilizing zone and a vacuum zone for volatile components removal to obtain a terminal-stabilized oxymethylene copolymer, separately melt-kneading a polyoxymethylene and a stabilizer and/or an additive in other extruder (B), feeding the resulting melt-kneading mixture in a molten state into a section of the extruder (A) following the vacuum zone for volatile components removal so that the proportions of the polyoxymethylene to be fed from the extruder (B) and the crude oxymethylene copolymer to be subjected to terminal stabilization in the extruder (A) become 1:3 to 1:45 by weight ratio, and kneading the polyoxymethylene, the stabilizer and/or the additive and the terminal-stabilized oxymethylene copolymer.

10 Claims, No Drawings

PROCESS FOR PRODUCTION OF STABILIZED OXYMETHYLENE COPOLYMER

TECHNICAL FIELD

The present invention relates to a process for producing a stable oxymethylene copolymer by efficiently mixing a stabilizer and/or an additive into an oxymethylene copolymer. More particularly, the present invention relates to a process for producing a stabilized oxymethylene copolymer, which comprises subjecting a crude oxymethylene copolymer to terminal stabilization in an extruder (A) having a terminal-stabilizing zone and a vacuum zone for volatile components removal and mixing the terminal-stabilized oxymethylene copolymer with a stabilizer and/or an additive, wherein the total or part of a melt-kneading mixture obtained by melt-kneading a polyoxymethylene and a stabilizer and/or an additive in other extruder (B) is fed in a molten state into a section of the extruder (A) following the vacuum zone for volatile components removal, to knead the terminal-stabilized oxymethylene copolymer, the polyoxymethylene and the stabilizer and/or the additive.

BACKGROUND ART

Mixing of a stabilizer and/or an additive into a synthetic resin for improvement of properties of the resin has heretofore been conducted by uniformly mixing a synthetic resin powder with a stabilizer and/or an additive in a Henschel mixer and then heat-melting the resulting mixture in a single or double screw extruder.

In the case of an oxymethylene copolymer, the copolymer immediately after polymerization has thermally unstable terminals [—(OCH$_2$)$_n$—OH] and therefore is generally subjected to terminal stabilization in a molten state by the use of a vent type screw extruder. With respect to the mixing of a stabilizer and/or an additive into a crude oxymethylene copolymer, JP-A-63-196615 discloses completely melting a crude copolymer in an extruder, then mixing therewith a terminal stabilizer and an auxiliary in a pressurized region in the extruder and continuously removing unstable components from the crude copolymer. This publication also discloses in the examples a method for removing unstable components wherein a melt-kneading mixture composed of a stabilizer and/or an additive and polyoxymethylene is introduced into the pressurized region in the extruder.

The position at which and the amount in which the melt-kneading mixture is introduced into the extruder, being disclosed in the above publication, however, results in problems of reduced thermal stability, coloring, etc. of the resulting oxymethylene copolymer, when there is used such a stabilizer and/or an additive as to have reactivity with the terminal stabilizer used or with formaldehyde gas generated during terminal stabilization. Further, since terminal stabilization is often conducted in the vacuum zone of extruder for volatile components removal to intensify the vacuum removal of volatile components for higher terminal stabilization, the stabilizer and/or the additive diffuses into the gas to be vented; thus, the above mixing is also economically disadvantageous.

It is also known to subject a crude oxymethylene copolymer to terminal stabilization and then to feed a stabilizer and/or an additive to a section of an extruder following the vacuum zone for volatile components removal. In this case, however, direct feeding of the stabilizer and/or the additive per se to the copolymer tends to invite poor dispersion of the stabilizer and/or the additive. In order to improve the dispersibility, a means such as making L/D of the extruder larger wherein L is the length of the extruder in the direction of the rotation axis and D is the inner diameter of the extruder, is necessary. This approach is economically disadvantageous as well and tends to invite the thermal deterioration of resin.

Hence, there has been strongly desired a process for producing a stable oxymethylene copolymer, excellent in quality and economy, which is free from the above-mentioned problems.

DISCLOSURE OF THE INVENTION

The present invention has been made in view of the above-mentioned situation. According to the present invention there is provided a process for producing a stabilized oxymethylene copolymer, which comprises: (1) subjecting a crude oxymethylene copolymer to terminal stabilization in a first extruder (A) having a terminal-stabilizing zone and a vacuum zone for volatile components removal to obtain a terminal-stabilized oxymethylene copolymer, (2) separately melt-kneading a polyoxymethylene and at least one material chosen from the group consisting of; a stabilizer and an additive in a second extruder (B), (3) feeding the resulting melt-kneaded mixture in a molten state into a section of the first extruder (A) following the vacuum zone for volatile components removal wherein the proportions of the polyoxymethylene fed from the second extruder (B) to the crude oxymethylene copolymer to be subjected to terminal stabilization in the first extruder (A) is respectively, from 1:3 to 1:45 by weight ratio, and (4) the polyoxymethylene, the material additive and the terminal-stabilized oxymethylene copolymer.

BEST MODE FOR CARRYING OUT THE INVENTION

The present invention is described in detail below.

In the present invention, the polyoxymethylene to be melt-kneaded with a stabilizer and/or an additive in the extruder (B) may be any of a homopolymer, a copolymer, or a mixture thereof.

The extruder (A) can be any of a single screw extruder and a multiple, or twin, screw extruder as long as it has a terminal-stabilizing zone and a vacuum zone for volatile components removal. A vent type double screw extruder is used preferably. The extruder (B) may optionally have a vent hole, and may be a single screw type.

The crude oxymethylene copolymer in the present invention is a copolymer of formaldehyde or trioxane with a cyclic ether and/or a cyclic formal and has a thermally unstable group —(OCH$_2$)$_n$—OH at part of the molecular terminals. The word "crude" preceding the term "oxymethylene copolymer" means the said copolymer having the above-mentioned thermally unstable group at fraction of the molecular terminals. Therefore, the stabilization of the molecular terminals in the extruder (A) is necessary.

In the present specification, the terminal-stabilizing zone refers to a section of the extruder (A) wherein the unstable molecular terminals are decomposed under pressure by the use of a terminal stabilizer (e.g. a basic substance) and an auxiliary, i.e. water and/or an organic solvent to stabilize the oxymethylene copolymer. Since the sufficient kneading of the crude oxymethylene copolymer, the terminal stabilizer and the auxiliary is important, a screw preferably used in the extruder is preferably constituted by kneading elements in a part or the whole region of the terminal-stabilizing zone.

Each kneading element may be a disc type, but a block type composed of a plurality of kneading elements may also be used.

The temperature for terminal stabilization is in a range from the melting point of the oxymethylene copolymer to 265° C. and a particularly preferable temperature range is 190–230° C.

The vacuum zone for volatile components removal refers to a section of the extruder (A) which has a vent and wherein the unreacted monomers contained in the crude oxymethylene copolymer, the formaldehyde generated during terminal stabilization, the terminal stabilizer, the auxiliary, etc. are removed under reduced pressure.

The extruder (A) and the extruder (B) may be connected by the use of, for example, a double tube, or may be connected directly.

The basic substance used as the terminal stabilizer is particularly preferably ammonia or an aliphatic amine compound such as triethylamine, tributylamine, etc. As other basic substances, there are mentioned hydroxides, inorganic weak acid salts, organic acid salts, etc. of alkali metals or alkaline earth metals. Specific examples thereof are hydroxides, carbonates, phosphates, silicates, borates, formates, acetates, stearates, palmitates, propionates, succinates, etc. of sodium, potassium, magnesium, calcium or barium.

The amount of these basic substances added is 0.01–5 parts by weight based on the oxymethylene copolymer in the case of ammonia or the amine compounds. In the case of hydroxides, inorganic weak acid salts, organic acid salts, etc. of alkali metals or alkaline earth metals, the amount added is limited to 2 to 5,000 ppm because of the problems of coloring, etc.

In the extruder (B) were melt-kneaded polyoxymethylene and a stabilizer and/or an additive.

Preferably 50–100%, more preferably 70–100% of the resulting melt-kneaded mixture is fed into a section of the extruder (A) following the vacuum zone for volatile components removal, with the molten state being maintained. When the amount fed into said section of the extruder (A) is less than 50%, the resulting oxymethylene copolymer has problems in quality, coloring, etc.

In the present invention, the extruder (A) is preferably a double screw extruder, and the section of the extruder (A) following the inlet for the polyoxymethylene containing a stabilizer and/or an additive has an L/D of preferably 0.5–25, more preferably 1–20. When the L/D is less than 0.5, the uniform mixing of the oxymethylene copolymer, the polyoxymethylene and the stabilizer and/or the additive is difficult. When the L/D is more than 25, the resulting oxymethylene copolymer has a problem in thermal stability.

The proportions of the polyoxymethylene to be fed from the extruder (B) and the crude oxymethylene copolymer to be subjected to terminal stabilization in the extruder (A) are respectively 1:3 to 1:45, preferably 1:5 to 1:40, more preferably 1:5 to 1:30, all by weight ratio. A proportion of the crude oxymethylene copolymer smaller than the above results in poor economy. With a proportion of the crude oxymethylene copolymer larger than the above, the concentration of the stabilizer and/or the additive in the polyoxymethylene in the extruder (B) must be very high in order to feed a required amount of the stabilizer and/or the additive to the extruder (A), which makes the dispersion of the stabilizer and/or the additive in the polyoxymethylene in the extruder (B) and invites the thermal deterioration, discoloration, etc. of the stabilizer and/or the additive.

Further, screw slippage, etc. occurs depending upon the kind of stabilizer and/or additive used, reducing the operability of the system. Furthermore, the uniform dispersion of the polyoxymethylene and the stabilizer and/or the additive in the oxymethylene copolymer in the extruder (A) is difficult and the resulting oxymethylene copolymer has reduced thermal stability.

With respect to the resin properties of the oxymethylene copolymer and the polyoxymethylene both used in the present invention, the ratio of the melt index, MI, of the polyoxymethylene to be fed from the extruder (B) and the MI of the crude oxymethylene copolymer to be subjected to terminal stabilization in the extruder (A) is preferably 1/50 to 50, more preferably 1/30 to 30. When the ratio deviates from the first range, the uniform mixing of the polyoxymethylene and the oxymethylene copolymer is difficult.

In the extruder (A), it is preferable that the amount of formaldehyde, which is formed by the decomposition of unstable terminals or which is present as residual formaldehyde, in the oxymethylene copolymer after terminal stabilization and volatile components removal under reduced pressure is controlled at 1,000 ppm or less. When the amount of formaldehyde is more than 1,000 ppm, there arise problems such as coloring of oxymethylene copolymer and the like.

According to the present invention, a stabilizer and/or an additive can be stably and uniformly mixed into the crude oxymethylene copolymer, and an oxymethylene copolymer excellent in quality and economy can be obtained.

In the present invention, there can be used, as the stabilizer and the additive, known stabilizers and additives added to oxymethylene copolymers, that is, an antioxidant, a formaldehyde catcher, a light stabilizer, an ultraviolet absorber, a lubricant, a nucleating agent, an antistatic agent, a filler, talc, etc.

As the antioxidant, there can be mentioned, for example, n-octadecyl 3-(3',5'-di-t-butyl-4'-hydroxyphenyl) propionate, n-octadecyl 3-(3'-methyl-5'-t-butyl-4'-hydroxyphenyl)propionate, n-tetradecyl 3-(3',5'-di-t-butyl-4'-hydroxyphenyl)propionate, 1,6-hexanediol bis-(3-(3,5-di-t-butyl-4-hydroxyphenyl)propionate, 1,4-butanediol bis-(3-(3,5-di-t-butyl-4-hydroxyphenyl)propionate, triethylene glycol bis-[3-(3-t-butyl-5-methyl-4-hydroxyphenyl) propionate], tetrakis-(methylene 3-(3',5'-di-t-butyl-4'-hydroxyphenyl)propionate) methane, N,N'-bis(3-(3,5-di-t-butyl-4-hydroxyphenol)propionyl)hydrazine, N,N'-tetramethylenebis-3-(3'-methyl-5'-t-butyl-4-hydroxyphenol) propionyldiamine, N,N'-bis-3-(3',5'-di-t-butyl-4-hydroxyphenol)propionylhexamethylenediamine, 3-(N-salicyloyl)amino-1,2,4-triazole, N,N'-bis(2-(3-(53,5-dibutyl-4-hydroxyphenyl)propionyloxy)ethyl)oxyamide, etc. These antioxidants may be used singly or as admixture of two or more. The amount of the anti-oxidant used is preferably 0.01–3 parts by weight, more preferably 0.03–1 part by weight per 100 parts by weight of the oxymethylene copolymer.

The formaldehyde catcher is typically a nitrogen-containing compound reactive with formaldehyde and includes, for example, polyamide resins, amide compounds, urea derivatives, triazine derivatives, urethane compounds, etc. The formaldehyde catcher specifically includes nylon 6, nylon 11, nylon 12, nylon 6•6, nylon 6•10, nylon 6/6•10, nylon 6/6•6, nylon 6•6/6•10 and nylon 6/6•6/6•10, which are obtained by condensation of a diamine and a dicarboxylic acid, condensation of amino acids, ring-opening polymerization of a lactam, etc; polyamide resins such as poly(β- alanine) and the like; amide compounds such as stearylstearamide, stearyloleamide, stearylerucamide, ethylenediamine-distearic acid amide, ethylenediamine-dibehenic acid amide, hexamethylenediamine-distearic acid amide, ethylenediamine-dierucic acid amide, xylylenediamine-dierucic acid amide, di(xylylene-diamine-stearic acid amide), sebacamide and the like, which are formed by an aliphatic monocarboxylic acid, an aliphatic dicarboxylic acid, an aromatic monocarboxylic acid or an aromatic dicarboxylic acid and an aliphatic monoamine, an aliphatic diamine, an aromatic monoamine or an aromatic diamine; urea derivatives such as N-phenylurea, N,N'-diphenylurea, N-phenylthiourea, N,N'-diphenylthiourea and the like; triazine derivatives such as melamine, benzoguanamine, N-phenylmelamine, melem, N,N'-diphenylmelamine, N-methylolmelamine, N,N'-trimethylolmelamine, 2,4-diamino-6-cyclohexyltriazine, melam and the like; and so forth.

These nitrogen-containing compounds may be used singly or as an admixture of two or more. The amount of the nitrogen-containing compound added is preferably 0.01–2 parts by weight, more preferably 0.03–1 part by weight per 100 parts by weight of the oxymethylene copolymer.

As another stabilizer, there is mentioned a basic compound capable of neutralizing formic acid. It includes, for example, hydroxides, inorganic weak acid salts, organic acid salts, etc. of alkali metals or alkaline earth metals. Specific examples thereof are hydroxides, carbonates, phosphates, silicates, borates, formates, acetates, stearates, palmitates, propionates, succinates, etc. of sodium, potassium, magnesium, calcium, or barium.

These basic compounds may be used singly or as an admixture of two or more. The amount of the basic compound used is preferably 0.01–3 parts by weight, more preferably 0.03–1 part by weight per 100 parts by weight of the oxymethylene copolymer.

Some of the stabilizers and additives are not reacted with the terminal stabilizer or the formaldehyde generated during terminal stabilization and are thermally stable. Such a stabilizer and/or an additive, when used, may be directly and by itself added to the extruder (A) separately from the extruder (B) before terminal stabilization, if economy is ignored.

Next, the present invention is described more specifically by way of Examples. However, the present invention is not restricted to these Examples.

The substances and methods used in the Examples are as follows.

(1) Production of crude oxymethylene copolymer

Trioxane (3 kg/hr), 1,3-dioxolane (4.5 mole % per mole of trioxane) and boron trifluoride dibutyl etherate as polymerization catalyst ($0.15 \times 10^{-4}$ mole) were continuously fed into a continuous mixer and reactor constituted by two rotary shafts each provided with a plurality of paddles, the paddles of one shaft being engaged with the paddles of the other shaft. The polymer discharged from the reactor was introduced into a 1% aqueous triethylamine solution in a nitrogen atmosphere to conduct a deactivation treatment for 1 hour. The resulting polymer was collected by filtration and dried to obtain a crude oxymethylene copolymer. The polymer had an MI of 9.8.

(2) Extruder (A)

A 30 mm anisotropic double screw extruder having a terminal-stabilizing zone constituted by kneading elements and a vacuum zone for volatile components removal. The extrusion temperature was 200° C. and the L/D of the section following the inlet for feed from an extruder (B) was 5.

(3) Extruder (B)

A 30 mm anisotropic double screw extruder having no vent was used. The extrusion temperature was 200° C.

(4) Amount of formaldehyde generated

The amount of formaldehyde generated is expressed as the amount of formaldehyde generated when the stabilized oxymethylene copolymer was heated at 230° C. The formaldehyde gas generated at 230° C. for 40 minutes in nitrogen was allowed to be absorbed by water and then titration was conducted to measure the amount (ppm) of formaldehyde.

(5) TGA

Thermogravimetric analysis was conducted up to a time (min) when 5% reduction in weight of the stabilized oxymethylene copolymer took place at 230° C. in air.

(6) Color (bl: yellowness)

Color was measured by the use of a color difference meter (MODEL 1000 DP, a product of Nippon Denshoku Kogyo Co., Ltd.).

(7) MI (Measured per ASTM D1238)

Flowability of polymers was measured by the use of MELT INDEXER, a product of Toyo Seiki, under the conditions of 190° C. and 2,160 g load (g/10 min).

EXAMPLE 1 (present invention)

Ninety parts by weight of a crude oxymethylene copolymer was fed into an extruder (A). In the extruder (A), the fed crude oxymethylene copolymer was sent under pressure to the terminal-stabilizing zone while being heat-melted. In the terminal-stabilizing zone, 3 parts by weight of a terminal stabilizer (aqueous triethylamine solution) was added to the crude oxymethylene copolymer to conduct the terminal stabilization of the copolymer, and the stabilized copolymer was sent under pressure to the next vacuum zone for volatile components removal. In the vacuum zone for volatile components removal, the formaldehyde generated by the terminal stabilization and the like was removed out of the system by pressure reduction. Separately, into an extruder (B) were fed 10 parts by weight of a polyoxymethylene (a copolymer of MI=9.2), 0.3 part by weight of an antioxidant [N,N-bis (3-(3,5-di-t-butyl-4-hydroxyphenol) propionyl)hydrazine] and 0.2 part by weight of a heat stabilizer calcium stearate (St-Ca), and the ingredients were melt-kneaded. The whole of the melt-kneading mixture was fed in a molten state into a section of the extruder (A) following the vacuum zone for volatile components removal and was kneaded with the terminal-stabilized oxymethylene copolymer, after which the kneaded mixture was pelletized.

Separately from the above operation, there was measured the amount of formaldehyde in the oxymethylene copolymer after terminal stabilization and volatile components removal under reduced pressure, which was generated by the decomposition of unstable terminals and which was present as residual formaldehyde. Added to the oxymethylene copolymer was, for prevention of decomposition of the main chain, only an antioxidant (triethylene glycol bis[3-(3-t-butyl-5-methyl-4-hydroxyphenyl)propionate]), and the copolymer was subjected to terminal stabilization in the extruder (A). The amount of formaldehyde measured was 510 ppm.

EXAMPLE 2 (present invention)

Terminal stabilization and volatile components removal were conducted in the same manner as in Example 1 except that the amount of the polyoxymethylene containing an antioxidant and a heat stabilizer, fed into a section of the extruder (A) following the vacuum zone for volatile components removal was changed to 9 parts by weight and the remaining 1 part by weight was fed into the terminal-stabilizing zone of the extruder (A). The resulting oxymethylene copolymer was pelletized.

The amount of formaldehyde in the oxymethylene copolymer after terminal stabilization and volatile components removal under reduced pressure, which was generated by the decomposition of unstable terminals and which was present as residual formaldehyde, was 520 ppm.

EXAMPLE 3 (present invention)

Terminal stabilization and volatile components removal were conducted in the same manner as in Example 1 except that the antioxidant fed into the extruder (B) was changed to 0.3 part by weight of 2,2'-methylenebis(4-methyl-6-t-butylphenol). The resulting oxymethylene copolymer was pelletized.

The amount of formaldehyde in the oxymethylene copolymer after terminal stabilization and volatile components removal under reduced pressure, which was generated by the decomposition of unstable terminals and which was present as residual formaldehyde, was 500 ppm.

EXAMPLE 4 (present invention)

Terminal stabilization and volatile components removal were conducted in the same manner as in Example 1 except that the antioxidant and stabilizer fed into the extruder (B) were changed to 0.3 part by weight of triethylene glycol bis[3-(3-t-butyl-5-methyl -4-hydroxyphenyl)propionate] and 0.2 part by weight of nylon 6•6, respectively. The resulting oxymethylene copolymer was pelletized.

The amount of formaldehyde in the oxymethylene copolymer after terminal stabilization and volatile components removal under reduced pressure, which was generated by the decomposition of unstable terminals and which was present as residual formaldehyde, was 530 ppm.

EXAMPLE 5 (present invention)

Terminal stabilization and volatile components removal were conducted in the same manner as in Example 1 except that the antioxidant and heat stabilizer fed into the extruder (B) were changed to pentaerythrityl tetrakis(3-(3,5-t-butyl-4-hydroxy-phenyl)propionate) and 0.2 part by weight of melamine, respectively. The resulting oxymethylene copolymer was pelletized.

The amount of formaldehyde in the oxymethylene copolymer after terminal stabilization and volatile components removal under reduced pressure, which was generated by the decomposition of unstable terminals and which was present as residual formaldehyde, was 520 ppm.

EXAMPLE 6 (present invention)

Terminal stabilization and volatile components removal were conducted in the same manner as in Example 4 except that 0.2 part by weight of melamine was further added as another heat stabilizer fed into the extruder (B). The resulting oxymethylene copolymer was pelletized.

The amount of formaldehyde in the oxymethylene copolymer after terminal stabilization and volatile components removal under reduced pressure, which was generated by the decomposition of unstable terminals and which was present as residual formaldehyde, was 530 ppm.

EXAMPLE 7 (present invention)

Terminal stabilization and volatile components removal were conducted in the same manner as in Example 1 except that the amount of the crude oxymethylene copolymer fed into the extruder (A) was changed to 95 parts by weight and, in the extruder (B), the amount of the polyoxymethylene fed was changed to 5 parts by weight and there were added 0.3 part by weight of an antioxidant (N,N'-bis-(3-(3,5-di-t-butyl-4-hydroxyphenol)propionyl)hydrazine) and 0.2 part by weight of a heat stabilizer (melamine). The resulting oxymethylene copolymer was pelletized.

The amount of formaldehyde in the oxymethylene copolymer after terminal stabilization and volatile components removal under reduced pressure, which was generated by the decomposition of unstable terminals and which was present as residual formaldehyde, was 540 ppm.

EXAMPLE 8 (present invention)

Terminal stabilization and volatile components removal were conducted in the same manner as in Example 1 except that in the extruder (A), the L/D of the section following an inlet for polyoxymethylene containing a stabilizer and/or an additive was changed to 3 and, in the extruder (B), the antioxidant and heat stabilizer both to be fed together with a polyoxymethylene were changed to 0.3 part by weight of 2,2'-methylenebis-(4-methyl-6-t-butylphenol) and 0.2 part by weight of nylon 6•6, respectively. The resulting oxymethylene copolymer was pelletized.

The amount of formaldehyde in the oxymethylene copolymer after terminal stabilization and volatile components removal under reduced pressure, which was generated by the decomposition of unstable terminals and which was present as residual formaldehyde, was 540 ppm.

EXAMPLE 9 (present invention)

Terminal stabilization and volatile components removal were conducted in the same manner as in Example 1 except that in the extruder (A), the L/D of the section following an inlet for polyoxymethylene containing a stabilizer and/or an additive was changed to 10 and, in the extruder (B), the antioxidant and heat stabilizer both to be fed together with a polyoxymethylene were changed to 0.3 part by weight of triethylene glycol bis[3-(3-t-butyl-5-methyl-4-hydroxyphenyl)propionate] and 0.2 part by weight of calcium stearate respectively. The resulting oxymethylene copolymer was pelletized.

The amount of formaldehyde in the oxymethylene copolymer after terminal stabilization and volatile components removal under reduced pressure, which was generated by the decomposition of unstable terminals and which was present as residual formaldehyde, was 530 ppm.

EXAMPLE 10 (present invention)

Terminal stabilization and volatile components removal were conducted in the same manner as in Example 4 except that the polyoxymethylene fed into the extruder (B) was changed to a copolymer of MI=3.2. The resulting oxymethylene copolymer was pelletized.

The amount of formaldehyde in the oxymethylene copolymer after terminal stabilization and volatile components removal under reduced pressure, which was generated by the decomposition of unstable terminals and which was present as residual formaldehyde, was 520 ppm.

EXAMPLE 11 (comparison)

Added to 100 parts by weight of a crude oxymethylene copolymer were 0.3 part by weight of an antioxidant (N,N'-bis(3-(3,5-di-t-butyl-4-hydroxy-phenol)propionyl)

hydrazine) and 0.2 part by weight of a heat stabilizer (melamine). They were stirred and mixed in a Henschel mixer for 10 minutes and fed into an extruder (A). In the extruder (A), the crude oxymethylene copolymer and stabilizer fed were sent under pressure to the terminal-stabilizing zone while being heat-melted. In the terminal-stabilizing zone, 3 parts by weight of a terminal stabilizer (aqueous triethylamine solution) was added to the crude oxymethylene copolymer to conduct the terminal stabilization of the copolymer, and the stabilized copolymer was sent to the next vacuum zone for volatile components removal. In the vacuum zone for volatile components removal, the formaldehyde generated by the terminal stabilization and the like was removed out of the system by pressure reduction. The oxymethylene copolymer, the stabilizer and the additive were discharged with further kneading and pelletized.

EXAMPLE 12 (comparison)

Terminal stabilization and volatile components removal were conducted in the same manner as in Example 11 except that the antioxidant was changed to 0.3 part by weight of 2,2'-methylenebis (4-methyl-6-t-butylphenol) and the heat stabilizer was changed to 0.2 part by weight of calcium stearate. The resulting oxymethylene copolymer was pelletized.

EXAMPLE 13 (comparison)

Terminal stabilization and volatile components removal were conducted in the same manner as in Example 11 except that the antioxidant was changed to 0.3 part by weight of triethylene glycol bis[3-(3-t-butyl-5-methyl-4-hydroxyphenyl)propionate] and the heat stabilizer was changed to 0.2 part by weight of nylon 6•6. The resulting oxymethylene copolymer was pelletized.

EXAMPLE 14 (comparison)

Terminal stabilization and volatile components removal were conducted in the same manner as in Example 11 except that the antioxidant was changed to 0.3 part by weight of pentaerythrityl tetrakis (3-(3,5-t-butyl-4-hydroxyphenyl) propionate) and the heat stabilizer was changed to 0.2 part by weight of melamine. The resulting oxymethylene copolymer was pelletized.

EXAMPLE 15 (comparison)

One hundred parts by weight of a crude oxymethylene copolymer was fed into an extruder (A). In the extruder (A), the fed crude oxymethylene copolymer was sent under pressure to the terminal-stabilizing zone while being heat-melted. In the terminal-stabilizing zone, 3 parts by weight of a terminal stabilizer (aqueous triethylamine solution) was added to the crude oxymethylene copolymer to conduct the terminal stabilization of the copolymer, and the stabilized copolymer was sent under pressure to the next vacuum zone for volatile components removal. In the vacuum zone for volatile components removal, the formaldehyde generated by the terminal stabilization and the like was removed out of the system by pressure reduction. Into the section of the extruder (A) following the vacuum zone for volatile components removal were fed, directly in powdery forms, 0.3 part by weight of an antioxidant (triethylene glycol bis[3-(3-t-butyl-5-methyl-4-hydroxyphenyl)-propionate]) and 0.2 part by weight of a heat stabilizer (nylon 6•6), and the ingredients were kneaded with the terminal-stabilized oxymethylene copolymer. The kneading mixture was discharged and pelletized.

The oxymethylene copolymers obtained in Examples 1–10 (present invention) and Examples 11–15 (comparison) were measured for heat stability and coloring, and the results are shown in Tables 1 and 2. In Examples 1–10 (present invention), as compared with Examples 11–15 (comparison), uniform dispersion of antioxidant and heat stabilizer was possible and polymers with excellent heat stability and coloring could be obtained.

TABLE 1

| Example No. (present invention) | Extruder (A) | | L/D of section following inlet for feed from extruder (B) | Extruder (B) | | | Evaluation | |
|---|---|---|---|---|---|---|---|---|
| | Crude oxy- methylene copolymer (parts by wt.) | Stabilizer and additive (part by wt.) | | Polyoxy- methylene (parts by wt.) | Stabilizer and additive (part by wt.) | | Upper: amount of formaldehyde generated (ppm) Lower: TGA (min) | Color bl |
| Example 1 | 90 | 0 | 5 | 10 | Antioxidant A*1 | 0.3 | 401 | −1.8 |
| | | | | | St-Ca | 0.2 | 51 | |
| Example 2*5 | 90 | 0 | 5 | 10 | Antioxidant A*1 | 0.3 | 433 | −1.3 |
| | | | | | St-Ca | 0.2 | 50 | |
| Example 3 | 90 | 0 | 5 | 10 | Antioxidant B*2 | 0.3 | 427 | −1.7 |
| | | | | | St-Ca | 0.2 | 50 | |
| Example 4 | 90 | 0 | 5 | 10 | Antioxidant C*3 | 0.3 | 6 | −1.7 |
| | | | | | Nylon 6.6 | 0.2 | 45 | |
| Example 5 | 90 | 0 | 5 | 10 | Antioxidant D*4 | 0.3 | 109 | −1.6 |
| | | | | | Melamine | 0.2 | 52 | |
| Example 6 | 90 | 0 | 5 | 10 | Antioxidant C*3 | 0.3 | 3 | −1.8 |
| | | | | | Nylon 6.6 | 0.2 | 59 | |
| | | | | | Melamine | 0.2 | | |
| Example 7 | 95 | 0 | 5 | 5 | Antioxidant A*1 | 0.3 | 95 | −1.8 |
| | | | | | Melamine | 0.2 | 48 | |
| Example 8 | 90 | 0 | 3 | 10 | Antioxidant B*2 | 0.3 | 14 | −1.6 |
| | | | | | Nylon 66 | 0.2 | 42 | |

TABLE 1-continued

| | Extruder (A) | | | | | | Evaluation | |
|---|---|---|---|---|---|---|---|---|
| | Crude | | L/D of | | | | Upper: amount of | |
| | oxy- | Stabilizer | section | | Extruder (B) | | formaldehyde | |
| Example | methylene | and | following | Polyoxy- | | | generated (ppm) | |
| No. | copolymer | additive | inlet for | methylene | Stabilizer and | | Lower: TGA | Color |
| (present | (parts by | (part by | feed from | (parts by | additive | | (min) | bl |
| invention) | wt.) | wt.) | extruder (B) | wt.) | (part by wt.) | | | |
| Example 9 | 90 | 0 | 10 | 10 | Antioxidant C*3 | 0.3 | 364 | −1.8 |
| | | | | | St-Ca | 0.2 | 53 | |
| Example 10 | 90 | 0 | 5 | 10 | Antioxidant D*4 | 0.3 | 122 | −1.7 |
| | | | | | Melamine | 0.2 | 45 | |

TABLE 2

| | Extruder (A) | | | | | | Evaluation | |
|---|---|---|---|---|---|---|---|---|
| | Crude | | L/D of | | | | Upper: amount of | |
| | oxy- | | section | | Extruder (B) | | formaldehyde | |
| Example | methylene | Stabilizer and | following | Polyoxy- | | | generated (ppm) | |
| No. | copolymer | additive | inlet for | methylene | Stabilizer and | | Lower: TGA | Color |
| (comparison) | (parts by wt.) | (part by wt.) | feed from extruder (B) | (parts by wt.) | additive (part by wt.) | | (min) | bl |
| Example 11 | 100 | Antioxidant A*1 | 0.3 | 5 | 0 | 0 | | 447 | +0.4 |
| | | Melamine | 0.2 | | | | | 30 | |
| Example 12 | 100 | Antioxidant B*2 | 0.3 | 5 | 0 | 0 | | 586 | +2.1 |
| | | St-Ca | 0.2 | | | | | 34 | |
| Example 13 | 100 | Antioxidant C*3 | 0.3 | 5 | 0 | 0 | | 229 | +1.4 |
| | | Nylon 6.6 | 0.2 | | | | | 22 | |
| Example 14 | 100 | Antioxidant D*4 | 0.3 | 5 | 0 | 0 | | 395 | +0.5 |
| | | Melamine | 0.2 | | | | | 33 | |
| Example 15*6 | 100 | 0 | | 5 | 0 | Antioxidant C*3 | 0.3 | 127 | −1.4 |
| | | | | | | Nylon 66 | 0.2 | 20 | |

*1Antioxidant A: N,N'-bis(3-(3,5-di-t-butyl-4-hydroxyphenol)propionyl)hydrazine
*2Antioxidant B: 2,2'-methylenebis(4-methyl-6-t-butylphenol)
*3Antioxidant C: triethylene glycol bis(3-(3-t-butyl-5-methyl-4-hydroxyphenyl)propionate)
*4Antioxidant D: pentaerythrityl tetratis(3-(3,5-t-butyl-4-hydroxyphenyl)propionate)
*5In Example 2, the feeding of the oxymethylene copolymer containing an antioxidant and a heat stabilizer was conducted by, as mentioned above, feeding said copolymer of molten state in two portions, that is, 9 parts by weight into a section of the extruder (A) following the vacuum zone for volatile components removal and 1 part by weight into the terminal-stabilizing zone of the extruder (A).
*6In Example 15, the addition of the antioxidant and the heat stabilizer was conducted by, as mentioned above, feeding them directly in respective powder forms through an inlet in the extruder (A) which receives feed from the extruder (B), located downstream of the vacuum zone for volatile components removal.

EXAMPLE 16

Ninety parts by weight of a crude oxymethylene copolymer was fed into an extruder (A). In the extruder (A), the fed crude oxymethylene copolymer was sent under pressure to the terminal-stabilizing zone while being heat-melted. In the terminal-stabilizing zone, 3 parts by weight of a terminal stabilizer (aqueous triethylamine solution) was added to the crude oxymethylene copolymer to conduct the terminal stabilization of the copolymer, and the stabilized copolymer was sent under pressure to the next vacuum zone for volatile components removal. In the vacuum zone for volatile components removal, the formaldehyde generated by the terminal stabilization and the like was removed out of the system by pressure reduction. Separately, into an extruder (B) were fed 10 parts by weight of a polyoxymethylene (a copolymer of MI=9.2), 0.3 part by weight of an antioxidant (2,2'-methylene-bis(4-methyl-6-t-butylphenol) and 0.2 part by weight of a heat stabilizer (St-Ca), and the ingredients were melt-kneaded. The melt-kneading mixture was fed in a molten state into the terminal-stabilizing zone of the extruder (A). The resulting oxymethylene copolymer was pelletized. The results are shown in Table 3.

EXAMPLE 17

A crude oxymethylene copolymer (98.5 parts by weight) was fed into an extruder (A). In the extruder (A), the fed crude oxymethylene copolymer was sent under pressure to the terminal-stabilizing zone while being heat-melted. In the terminal-stabilizing zone, 3 parts by weight of a terminal stabilizer (aqueous triethylamine solution) was added to the crude oxymethylene copolymer to conduct the terminal stabilization of the copolymer, and the stabilized copolymer was sent under pressure to the next vacuum zone for volatile components removal. In the vacuum zone for volatile components removal, the formaldehyde generated by the terminal stabilization and the like was removed out of the system by pressure reduction. Separately, into an extruder (B) were fed 1.5 parts by weight of a polyoxymethylene (a copolymer of MI=9.2), 0.3 part by weight of an antioxidant (N,N'-bis(3-(3,5-di-t-butyl-4-hydroxyphenol)propionyl)hydrazine) and 0.2 part by weight of a heat stabilizer (melamine), and the ingredients were melt-kneaded. The melt-kneading mixture was fed in a molten state into the terminal-stabilizing zone of the extruder (A) and kneaded with the terminally stabilized oxymethylene copolymer. The resulting oxymethylene copolymer was pelletized. The results are shown in Table 3.

TABLE 3

| | Extruder (A) | | | Extruder (B) | | | Evaluation Upper: amount of formaldehyde generated (ppm) Lower: TGA (min) | |
|---|---|---|---|---|---|---|---|---|
| Example No. | Crude oxy-methylene copolymer (parts by wt.) | Stabilizer and additive (part by wt.) | L/D of section following inlet for feed from extruder (B) | Polyoxy-methylene (parts by wt.) | Stabilizer and additive (part by wt.) | | | Color b1 |
| Example 16*[7] | 90 | 0 | 15 | 10 | Antioxidant B*[2] St-Ca | 0.3 0.2 | 598 30 | +2.3 |
| Example 17 | 98.5 | 0 | 5 | 1.5 | Antioxidant A*[1] Melamine | 0.3 0.2 | 331 31 | −0.5 |

*[1])Same as A in Table 2
*[2])Same as B in Table 2
*[7]The addition of the stabilizer and the additive was conducted by, as mentioned above, melt-kneading, in the extruder (B), the polyoxymethylene, the stabilizer and the additive and then feeding the melt-kneading mixture into the terminal-stabilizing zone of the extruder (A).

INDUSTRIAL APPLICABILITY

According to the present invention, a stabilizer and/or an additive can be stably and uniformly mixed into a crude oxymethylene copolymer, and an oxymethylene copolymer excellent in quality and economy can be obtained.

What is claimed is:

1. A process for producing a stabilized oxymethylene copolymer, which comprises:

(1) subjecting a crude oxymethylene copolymer to terminal stabilization using a terminal stabilizer in a first extruder (A) having a terminal-stabilizing zone and a vacuum zone for volatile components removal to obtain a terminal-stabilized oxymethylene copolymer, (2) separately melt-kneading a polyoxymethylene and at least one material chosen from the group consisting of a stabilizer other than said terminal stabilizer and an additive in a second extruder (B), (3) feeding the resulting melt-kneaded mixture in a molten state into a section other than said terminal-stabilizing zone of the first extruder (A) following the vacuum zone for volatile components removal, wherein the proportions of the polyoxymethylene fed from the second extruder (B) to the oxymethylene copolymer subjected to terminal stabilization in the first extruder (A) is, respectively, from 1:3 to 1:45 by weight ratio, and (4) kneading the polyoxymethylene, the material and the terminal-stabilized oxymethylene copolymer, without repeating step (1) after step (3).

2. The process for producing a stabilized oxymethylene copolymer according to claim 1, wherein 50–100% of the melt-kneading mixture of the polyoxymethylene containing the material is fed from the second extruder (B) into a section of the first extruder (A) following the vacuum zone for volatile components removal.

3. The process for producing a stabilized oxymethylene copolymer according to claim 1, wherein the first extruder (A) is a double screw extruder which comprises a kneading zone of L/D of from 0.5 to 25 following the position at which the polyoxymethylene containing the material is fed.

4. The process for producing a stabilized oxymethylene copolymer according to claim 1, wherein the ratio of the melt index of the polyoxymethylene fed from the second extruder (B) and the melt index of the crude oxymethylene copolymer subjected to terminal stabilization in the first extruder (A) is from 1/50 to 50.

5. The process for producing a stabilized oxymethylene copolymer according to claim 1, wherein in the first extruder (A), the amount of formaldehyde in the oxymethylene copolymer after terminal stabilization and volatile components removal under reduced pressure is less than or equal to 1,000 ppm.

6. A process for producing a stabilized oxymethylene copolymer, which comprises the following steps:

(1) subjecting a crude oxymethylene copolymer to terminal stabilization using a terminal stabilizer in a first extruder (A) having a terminal-stabilizing zone and a vacuum zone for volatile components removal to obtain a terminal-stabilized oxymethylene copolymer, (2) separately melt-kneading a polyoxymethylene and at least one material chosen from the group consisting of a stabilizer other than said terminal stabilizer and an additive in a second extruder (B) to form a first mixture, (3) feeding the resulting melt-kneaded first mixture in a molten state into a section other than said terminal-stabilizing zone of the first extruder (A) following the vacuum zone for volatile components removal, wherein the ratio of the polyoxymethylene in the first mixture fed from the second extruder (B) to the oxymethylene copolymer subjected to terminal stabilization in the first extruder (A) is, respectively, from 1:5 to 1:40 by weight, and (4) kneading the first mixture and the terminal-stabilized oxymethylene copolymer to form a second mixture, without repeating step (1) after step (3).

7. The process for producing a stabilized oxymethylene copolymer according to claim 6, wherein 50–100% of the melt-kneaded first mixture is fed from the second extruder (B) into a section of the first extruder (A) following the vacuum zone for volatile components removal.

8. The process for producing a stabilized oxymethylene copolymer according to claim 6, wherein the first extruder (A) is a double screw extruder which comprises a kneading zone of L/D of from 0.5 to 25 following the position at which the first mixture is fed.

9. The process for producing a stabilized oxymethylene copolymer according to claim 6, wherein the ratio of the melt index of the polyoxymethylene in the first mixture fed from the second extruder (B) to the melt index of the crude oxymethylene copolymer subjected to terminal stabilization in the first extruder (A) is, respectively, from $\frac{1}{50}$ to 50.

10. The process for producing a stabilized oxymethylene copolymer according to claim 6, wherein in the first extruder (A), the amount of formaldehyde in the oxymethylene copolymer after terminal stabilization and volatile components removal under reduced pressure is less than or equal to 1,000 ppm.

* * * * *